3,256,368
PHENOLIC RESINS AS TACKIFIERS FOR
ETHYLENE-PROPYLENE RUBBERS
Anthony C. Soldatos, Kendall Park, and Allison S. Burhans, Millington, N.J., assignors to Union Carbide Corporation, a corporation of New York
No Drawing. Filed Jan. 11, 1963, Ser. No. 250,777
16 Claims. (Cl. 260—848)

The present invention relates to cyclohydrocarbyl substituted phenolic tackifying agents for ethylene-propylene rubber. More particularly, the present invention relates to the use of acid-catalyzed, fusible, non-heat reactive, carbocyclic substituted phenol-formaldehyde novolak resins and carbocyclicalkyl substituted phenol-formaldehyde novolak resins as tackifiers for ethylene-propylene rubber, wherein said carbocyclic group contains from 3 to 16 carbon atoms inclusive and wherein said alkyl group contains from 1 to 6 carbon atoms inclusive, for improving the "building tack" and adhesion of ethylene-propylene rubber and of rubber compositions containing them.

"Building tack" is the surface property of natural rubber which enables two pieces of unvulcanized stock to adhere together when brought in contact under moderate pressure. This phenomenon is specific between two pieces of natural rubber. Such stock will not adhere to other substances such as metal, glass or wood.

This attribute is important not only for rubber stock used in the manufacture of tires but of rubber stock used in tapes, calking compounds and the like. Uncured compositions of natural rubber, such as are used in the manufacture of tires, patches, tapes and the like, are inherently tacky. When two surfaces of natural rubber are pressed together, the two surfaces adhere. This permits assembly of rubber parts in an uncured state which can withstand rough treatment in handling. This property also permits natural rubber to be used as electrical tapes, and tire patches, and other such uses wherein a high degree of auto-adhesion is a pre-requisite. Sheets of natural rubber have been laminated together to attain a thick sheet of desired dimensions which can be used as molding stock; its inherent tack permits contact lamination. This procedure facilitates immediate preparation of molding stock of various thicknesses.

Ethylene-propylene synthetic rubbers unfortunately do not have this tack and as a result their use is somewhat limited in comparison to natural rubbers. Various expedients have been used to impart tack to other synthetic rubbers to be used where tack is a required or desired property. This induced tack, enables synthetic rubber to better compete with natural rubber.

The most successful of these expedients has been to incorporate into the synthetic rubber composition various polymeric resin compositions which possess tack and/or which can impart this property to the synthetic rubber in admixture.

It has been known heretofore to impart improved tack to other synthetic rubbers by incorporating therein additive tackifiers such as rosin, polyterpenes, coumarone-indene resins and the like. However, the degree of tack which these agents impart to rubbers is low and large amounts must be used. This in turn increases the cost of the product and deleteriously affects the desirable properties of the rubber. Until the present invention, no tackifying agent had been discovered which would effectively impart sufficient tack to ethylene-propylene rubber.

Adhesion as distinguished from building tack is that surface property of a substance which enables it to adhere to another substance having diverse properties, or to itself or other rubbers in the vulcanized state. Ethylene-propylene rubber adhering to metal, wood or paper are examples of adhesion. Unfortunately, ethylene-propylene rubber has no natural adhesive properties, and until the present invention, no effective means were known to impart adhesive properties to this rubber. The absence of this property excluded these rubbers from the fields of adhesive coatings, tapes and the like.

In accordance with the present invention it has been found that unobvious and unexpected results can be obtained by the incorporation of carbocyclic or carbocyclic-alkyl substituted phenol-formaldehyde novolak resins in ethylene-propylene rubber stock compositions. The use of such non-heat-reactive, phenol-formaldehyde, acid catalyzed novolak resins in ethylene-propylene rubber compositions increases the tack produced up to 100 percent over that produced by other phenol-formaldehyde resins used heretofore and increases the adhesion of said rubbers substantially. It has also been found that the tackifiers of the present invention have a lower inhibiting effect on vulcanization than do the tackifiers of the prior art. The inhibition effect of the prior art tackifiers restricts their use considerably.

The non-heat-reactive phenol-formaldehyde resins used in the present invention are those produced through the acid catalyzed reaction of formaldehyde and substituted phenols having the structural formula:

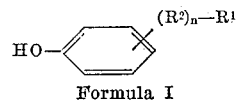

Formula I wherein $R^1$ is a cyclic monovalent hydrocarbon radical containing from 3 to 16 carbon atoms inclusive; $R^2$ is a divalent alkylene radical containing from about 1 to about 6 carbon atoms inclusive; $n$ is a digit having a value of from 0 to 1 inclusive, such that when $n$ is 0 then $R^1$ is attached directly to the phenol group. While it is not critical in this invention where the cyclohydrocarbyl group is attached to the phenol, those resins made from the para substituted phenol appear to give better results as the tackifying additives. However, if desired, those products made from ortho, meta, or mixed ortho and para substituted phenols can also be used.

Included within the term cyclic monovalent hydrocarbon radicals are the cycloaliphatic monovalent hydrocarbon radicals such as cycloalkyl radicals, for example, cyclopropyl, cyclobutyl, cyclopentyl, cyclohexyl, cycloheptyl, cyclooctyl, cyclononyl, cyclodecyl, cycloundecyl, cyclododecyl and the like; cycloalkenyl hydrocarbon radicals, for example, cyclopropenyl, cyclobutenyl, cyclopentenyl, dicyclopentenyl, cyclohexenyl, cyclohexadienyl, cycloheptenyl, cyclooctenyl, cyclononenyl, cyclodecenyl and the like; aromatic hydrocarbon radicals, for example, phenyl, tolyl, xylyl, mesityl, ethylphenyl, naphthyl and the like.

Illustrative of individual phenols as represented by Formula I above are cyclopropylphenol, cyclobutylphenol, cyclopentylphenol, cyclopentylmethylphenol, cyclopentylpropylphenol, cyclohexylethylphenol, cyclopenten-2-yl-phenol cyclotrideca - 1,5 - dienylphenol, phenylpropylphenol, phenylphenol, phenylethylphenol, benzylphenol and the like.

It should however be stressed that all of the novolak resins prepared from the phenols represented by Formula I substantially increase tack of the ethylene-proylene rubber compositions.

It has also been found that novolak resins made from other phenols such as phenol and alkyl phenols containing from 1 to 3, inclusive, carbon atoms in the alkyl moiety, such as cresol, ethyl phenol, propylphenol and isopropylphenol provide highly desirable results as tackifier agents either in combination with cyclohydrocarbyl substituted phenol novolak resins employed in this invention or even as the sole tackifier additive to the ethylene-propylene rubber. In addition, mixtures of these novolak resins may effectively be used within each class or between each class or between each class. These mixtures are advantageous in effectively imparting tack to ethylene-propylene rubbers while reducing the cost of the tackifier.

The cyclohydrocarbyl substituted phenols which are useful in preparation of the phenol-formaldehyde resins of the present invention can be prepared by reacting an excess phenol with the unsaturated hydrocarbon equivalent of cyclohydrocarbon substituent desired, in the presence of fuming sulfuric acid (oleum) or other suitable catalyst. The hydrocarbon reactant should be unsaturated at the desired locus of bonding. It should be noted that if two or more sites of unsaturation are available, only one will react; the other site becomes highly unreactive to the conditions of the reaction. Aromatic unsaturation is inherently non-reactive. The following illustration of the preparation of phenylethylphenol exemplifies this procedure.

ILLUSTRATION I

To a reaction flask is charged 118 grams of phenol, 104 grams of phenylethylene (styrene) and 2.92 grams of 105% sulfuric acid. The reaction temperature is raised to and maintained at 125° C. for a period of 15 hours. At the end of this reaction period the unreacted phenol and phenylethylene are removed by vacuum distillation and the product, phenylethylphenol isomeric mixture, is recovered from the residue.

It should be noted that the foregoing preparation and illustration produce ortho, meta and para phenol isomers. Any of these isomers can be used in preparation of the phenolic resin of the present invention, and in addition, mixtures of these isomers can also be used.

The substituted-phenol-formaldehyde novolak resins of the present invention can be prepared in the know manner of making novolak resins such as is disclosed by T. S. Carswell's text, "Phenoplasts, Their Structure, Properties, and Chemical Technology" (Interscience Publishers, New York, 1947), which is herewith incorporated by reference. This preparation can be accomplished by reacting at least 0.7 mole of formaldehyde per mole of substituted phenol in the presence of an acidic catalyst. It is preferred however to react from 0.9 to 1.5 moles of formaldehyde per mole of phenol as these ratios of reactants produce resins which generally do not tend to sinter after long periods of storage. The formaldehyde reactant can be used in aqueous solution such as formalin (37%–40%) or as paraform, i.e. the formaldehyde-yielding polymer of formaldehyde.

The condensation is generally effected by reacting the phenol-aldehyde mixture at a temperature of from about 20° to about 150° C. in the presence of a catalytic amount of acid catalyst.

Included within the term "ethylene-propylene rubbers" are all ethylene-propylene polymers normally characterized by rubbery properties. Normally these products have at least 20 percent of ethylene and propylene polymerized therein and can have a smaller amount of another ethylenically unsaturated monomer polymerized therein, as for example, ethyl acrylate, vinyl acetate, butenes, or dienes such as dicyclopentadiene 1,3-butadiene, isoprene, chloroprene, 1,3-pentadiene, 1,3-hexadiene and the like monomers. Preferably when present, the other unsaturated monomer is present in amounts less than about 10 percent by weight of the entire polymer. Generally, the preferred rubbers contain ethylene and propylene in the ratio of from 20:80 to 80:20. The preferred terpolymers generally contain from 1 to 10% of the diene component, such as cyclopentadiene, 1,3-butadiene, isoprene or chloroprene.

The amount of tackifying agent which is used in an ethylene-propylene rubber composition is largely dependent upon the ultimate use of the rubber. It should, however, be sufficient to increase the tack of the rubber employed. For example, when the tackified rubbers are to be used directly as solid stock material, such as in the manufacture of tires and generally mechanical goods, the cyclohydrocarbon substituted phenol-formaldehyde resins of the present invention are generally used in an amount of from two parts to twenty parts by weight per hundred parts by weight of rubber and preferably from three parts by weight to twelve parts by weight per hundred parts by weight of rubber. When the tackified rubber is to be used in adhesive applications where a very high degree of adhesion is necessary, the substituted phenol-formaldehyde resins of the present invention are generally used in an amount of from ten to one-hundred and fifty parts by weight per hundred parts by weight rubber, and preferably of from twenty to one-hundred parts by weight per one-hundred parts by weight of rubber. For all practical end uses, the phenol-formaldehyde resins of the present invention can be used in an amount of from two parts by weight to one hundred parts by weight per hundred parts by weight elastomeric material used.

The substituted phenol-formaldehyde novolak resin of the present invention can be conveniently admixed with the ethylene-propylene rubber by any of the conventional blending means known to the art. Illustrative of such blending means are stirring, mixing, milling, grinding and the like.

As noted above, mixed tackifiers can be used in accordance with the present invention. Mixed tackifiers are prepared by reacting mixtures of the various phenols described with formaldehyde, as described above. Tackifier mixtures can also be used. These mixtures are prepared by physically mixing different phenol-formaldehyde resins, as described.

Heat reactive phenol-formaldehyde resins i.e. resole type resins should not be used, as their presence affects the properties of the vulcanized rubber by excessively reducing tensile strength and tensile modulus, producing a stiffening effect.

It is contemplated that normal rubber additives can be present in the ethylene-propylene rubber stock of the present invention. Such additives include pigments, fillers, vulcanizers, accelerators, stabilizers, oxidation inhibitors and the like, as have been presently employed in the field of rubber technology.

One of the most commonly used, and perhaps most useful rubber additive is carbon black. This additive serves totally or in part as a filler, a vulcanization aid, a pigment, a stabilizer, and an antioxidant. For these reasons carbon black has acquired wide spread use in such products as vehicle tires, building materials, cable coatings and the like.

The test procedures herein used to measure the relative tack of the elastomer compositions in the examples that follow are:

*Hand tests.*—This test consists of pressing together two strips of the elastomer composition, then pulling them apart manually and judging the force required to separate them. All the samples were tested 24 hours after the resin was incorporated into the rubber unless otherwise noted. A commercially available mixed tackifier of octylphenol/butylphenol-formaldehyde, non-heat reactive novolak resin was used as the standard. In this standard the phenol comprised a mixture of p-octylphenol and p-t-butylphenol in a ratio of from about 9 to 1.

*Ring and ball melting point.*—This data was obtained in accordance with the procedures defined in ASTM E–28–51T.

The examples which follow serve to illustrate this invention. Unless otherwise indicated, all parts and percentages are by weight.

ILLUSTRATION II

A. *Preparation of phenylethylphenol - formaldehyde novolak resin.*—To a 2 liter reaction flask were added 200 grams of phenylethylphenol, as an isomeric mixture of 60 percent para substituted to 40 percent ortho substituted, and 0.2 gram of 97 percent sulfuric acid. This mixture was heated to a temperature of 90° C. and thereafter cooled to a temperature of 50° C. 75 grams of formaldehyde were then added, as a 40 percent aqueous solution and the temperature of the reaction mixture was raised to 100° C. This temperature was maintained for a period of about 30 minutes during which time the reaction mixture was continuously stirred. The reaction flask was then evacuated to a pressure of 50 millimeters of mercury and the water present in the reaction mixture was distilled off until a reaction temperature of 130° C. had been attained. This temperature was maintained until the reaction mixture had attained a ring and ball melting point of 190° F. The phenylethylphenol-formaldehyde resin was recovered directly by decantation.

B. *Preparation of p-cyclopenten-2-ylphenol-formaldehydenovolak resin.*—In a manner similar to that described in preparation A above p-cyclopenten-2-ylphenol-formaldehyde resin was prepared. The amounts of reactants used were as follows:

| | Grams |
|---|---|
| p-Cyclopenten-2-ylphenol | 160 |
| Formaldehyde (37% aqueous sol) | 81 |
| Sulfuric acid (97%) | 0.32 |

The reacted mixture was desolvated to a temperature of 150° C. unreacted phenol was removed by steam distillation. The resin was then heated to a temperature of 135° C. and maintained at this temperature until the resin attained ring and ball melting of 195° F.

The resin was recovered directly.

C. *Preparation of p-phenylphenol-formaldehyde novolak resin.*—In a manner similar to that described under preparation A above, p-phenylphenol-formaldehyde novolak resin was prepared. The amount of reactants used were:

| | Grams |
|---|---|
| p-Phenylphenol | 170 |
| Formaldehyde (40%) | 75 |
| Oxalic acid (97%) | 0.17 |

The reacted mixture was desolvated to a temperature of 160° C. The resin was maintained at this temperature until the ring and ball melting point of 210° F. had been attained. Other resins herein described were prepared in a similar manner.

*Example I.*—*Evaluation of phenol-formaldehyde resins as ethylene-propylene rubber tackifiers*

The phenol-formaldehyde resins prepared and described above were evaluated in various synthetic rubber systems using the hand test as described above. A commercially available mixed phenol-formaldehyde novolak resin of (octyl-butyl) phenol-formaldehyde was used as a control. In these evaluations the degree of tack of this control was assigned the arbirary value of 10. All other tack evaluations in the series are given values relative to the value of the control.

*Evaluation procedure.*—An ethylene-propylene rubber composition was prepared which had the following formulation:

| | Parts by weight |
|---|---|
| Ethylene-propylene (40% ethylene, 60% propylene having a Mooney viscosity of 35–49 at 212° F. for 8 minutes and a specific gravity of 0.86) | 100 |
| High abrasion furnace black | 50 |

A Banbury mixer was preheated to a temperature of 180° F. and the ethylene-propylene rubber was charged thereto. Starting at one minute, one-third portions of the carbon black were added at one minute intervals. After the addition of carbon black was complete, the mixing was continued for a period of one minute. The mixture was immediately charged to a two roll mill and the mixture was sheeted off at a thickness of ⅛ inch.

The tackifier resin incorporation was effected by charging the masterbatch ethylene-propylene-carbon black composition, defined above, to a two roll mill preheated to a temperature of 85° F. and adding 5 parts by weight of the resin to be evaluated per 100 parts by weight of rubber composition. This resin-rubber mixture was mixed for a period of 4–5 minutes and then sheeted off through the rolls of a two roll mill which had been set for ⅛ inch. Test specimens were then cut from these sheets and evaluated for tack by the hand method defined above 24 hours after preparation. The following results were obtained.

| No. | Phenol | Phenol-Formaldehyde, Mole Ratio | Ring and Ball Melting Point, ° F. | Catalyst | Tack After— | |
|---|---|---|---|---|---|---|
| | | | | | 1 day | 3 days |
| Standard | Octyl and Butyl | | 109 | | 10 | 10 |
| 1 | p-o-Phenylethyl | 1:1 | 185 | $H_2SO_4$ | 15 | |
| 2 | p-Phenylethyl | 1:1 | 278 | $H_2SO_4$ | 18 | 18 |
| 3 | p-Cyclopentenyl | 1:1 | [1] 146 | $H_2SO_4$ | 17 | |
| 4 | p-Phenyl | 1.6:1 | 210 | Oxalic Acid | 20 | |
| 5 | Cyclododeca-1,5-dienyl | 1:1 | 190 | $H_2SO_4$ | 14 | |

[1] Determined by standard metling point technique.

*Example II.*—*Determination of the effect of phenol-formaldehyde resins on the vulcanization of ethylene-propylene rubber*

An ethylene-propylene rubber stock composition having the following formulation was prepared:

| | Parts by weight |
|---|---|
| Ethylene-propylene rubber (40% ethylene, 60% propylene) having a Mooney viscosity of 35–49 centipoise at 212° F. for 8 minutes and having a specific gravity of 0.86 | 100 |
| High abrasion furnace carbon black | 45 |
| Calcium stearate | 1 |
| Process oil made by Humble Oil (aliphatic hydrocarbons) | 5 |
| Zinc oxide | 5 |
| Tackifying resin | 5 |
| Dicumyl peroxide | 2.6 |
| Sulfur | 0.3 |

The ethylene-propylene rubber compositions above was prepared by charging to a Banbury mixer at room temperature the ethylene-propylene rubber. At one-minute intervals the following ingredients were added.

(1) One-third carbon black and the calcium stearate
(2) One-third carbon black and the zinc oxide
(3) The remaining one-third carbon black (4) Aliphatic hydrocarbon process oil, dicumyl peroxide and sulfur.

These ingredients were mixed for a period of three minutes and then the tackifying agent was added. After an additional mixing period of five minutes the blended mixture was charged to a cool two roll mill and sheeted off at one-eighth inch. Test specimens were cut and cured at a temperature of 320° F. for a period of 30 minutes. The cured specimens were tested for tensile strength, elongation and stress of elongation. The following results were obtained.

| Resin | Phenol | Water Extracted [1] | Acid No. | Tensile Strength | Percent Elongation | Stress of Elongation % | | |
|---|---|---|---|---|---|---|---|---|
| Standard | Octyl-Butyl | No | 45.18 | 1,971 | 915 | 100 | 200 | 300 |
|  |  |  |  |  |  | 160 | 240 | 399 |
| 1 | p-o-Phenylethyl | No | 38.92 | 2,090 | 720 | 183 | 319 | 563 |
| 1 | p-o-Phenylethyl | Yes | 37.15 | 2,100 | 750 | 221 | 300 | 507 |
| 6 | Terpene phenol [2] | Yes | 0.57 | 523 | 1,305 | 116 | 131 | 151 |
| Control | None |  |  | 2,498 | 508 | 228 | 543 | 1,048 |

[1] The resin was dissolved into a non-water immerscible solvent (toluene) extracted with $H_2O$ and then desolvated by heat and vacuum.
[2] The reaction product of terpene (α-pinene,d l-limonene) and phenol using a boron trifluoride-phenol complex as catalyst.

These results show the degree of inhibition of vulcanization. As can be seen, all tackifiers inhibit vulcanization to some degree but those of the present invention exhibit a very low degree of inhibition.

*Example III*

In a manner similar to that described in Example I above, novolak resins prepared from formaldehyde and the phenols indicated below were compounded with, and evaluated as tackifiers for ethylene-propylene rubber compositions. The rubber compositions were the same as described in Example I above. These resins improved the tack of the rubber compositions as indicated.

| Phenol: | Tack after one day |
|---|---|
| Octyl and butyl | 10 |
| (Phenol) | 14 |
| p-Isopropyl | 13 |
| None (control) | 0 |

*Example IV.—Evaluation of phenol-formaldehyde resins as tackifiers for ethylene-propylene-diene terpolymer rubbers*

In a manner similar to that described in Example I above, novolak resins prepared from formaldehyde and the phenols indicated below were compounded with, and evaluated as tackifiers for ethylene-propylene-diene rubber compositions. A rubber having the following composition was used.

| | Parts |
|---|---|
| Ethylene-propylene-butadiene terpolymer (40% ethylene, 57% propylene, 3% butadiene) | 100 |
| High abrasion furnace carbon black | 50 |

The novolak resins were incorporated into the ethylene-propylene-diene rubber in a two roll mill at a temperature of about 140° C. Five parts of novolak resin were used per hundred parts rubber. The composition was milled for a period of from four to five minutes and then sheeted off. The samples were evaluated in accordance with the procedure described in Example I. The results obtained were as follows.

| No. | Phenol | Tack After— | |
|---|---|---|---|
|  |  | 1 day | 3 days |
| Standard (of Example 1) | Octyl and Butyl | 10 | 10 |
| #1 (of Example 1) | p-o-Phenylethyl | 15 | 15 |

What is claimed is:
1. A composition comprising an ethylene-propylene rubber and a tackifying amount of a fusible, non-heat hardenable, novolak resin of formaldehyde and a phenol having the formula

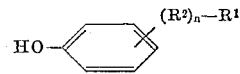

wherein $R^1$ is a monovalent cyclic hydrocarbon radial, $R^2$ is a divalent alkylene radical containing from about 1 to about 6 carbon atoms inclusive and $n$ is a digit having a value of from 0 to 1 inclusive.

2. The composition of claim 1 wherein $R^1$ is a cycloaliphatic hydrocarbon radical.

3. The composition of claim 1 wherein $n$ is 0.

4. The composition of claim 2 wherein $R^1$ is a phenyl radical.

5. The composition of claim 2 wherein $R^2$ is an ethylene radical.

6. The composition of claim 3 wherein $R^1$ is a cyclopentenyl radical.

7. The composition of claim 3 wherein $R^1$ is a cyclohexyl radical.

8. The composition of claim 3 wherein $R^1$ is a cyclododecadienyl radical.

9. The composition of claim 1 wherein said novolak resin is used in an amount of from 2 to 100 parts by weight per hundred parts by weight of rubber.

10. The composition of claim 1 wherein said novolak resin is used in an amount of from 3 to 12 parts by weight per hundred parts by weight of rubber.

11. The composition of claim 1 wherein the ethylene-propylene rubber contains ethylene and propylene in the ratio of from 20:80 to 80:20.

12. The method of imparting building tack to ethylene-propylene rubber stock by thoroughly admixing with said ethylene-propylene rubber a phenol-formaldehyde novolak resin which is a condensate of formaldehyde and a phenol having the formula:

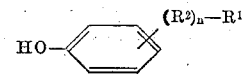

wherein $R^1$ is a monovalent cyclic hydrocarbon radical, $R^2$ is a divalent alkylene radical containing from about 1 to 6 carbon atoms inclusive and $n$ is a digit having a value of from 0 to 1 inclusive.

13. The method of claim 12 wherein $R^1$ is an aromatic radical.

14. The method of claim 12 wherein $R^1$ is a cycloaliphatic hydrocarbon radical.

15. The method of claim 12 wherein $n$ is 0.

16. The method of claim 12 wherein $n$ is 1.

References Cited by the Examiner

UNITED STATES PATENTS 2,659,706  11/1953  Fisk et al. _____ 260—848

OTHER REFERENCES

E. I. du Pont de Nemours and Company, Development Products Report, No. 18, ECD–330, A Sulfur-Curable, Ethylene-Propylene Elastomer.

MURRAY TILLMAN, *Primary Examiner.*

EDWARD J. TROJNAR, *Assistant Examiner.*